United States Patent
Dou et al.

(10) Patent No.: US 12,052,685 B2
(45) Date of Patent: Jul. 30, 2024

(54) TRACKING AREA UPDATE AND PAGING METHOD FOR NON-TERRESTRIAL SATELLITE NETWORKS

(71) Applicant: ZTE Corporation, Guangdong (CN)

(72) Inventors: Jianwu Dou, Guangdong (CN); Nan Zhang, Guangdong (CN); Xiaojuan Shi, Guangdong (CN); Wei Cao, Guangdong (CN); He Huang, Guangdong (CN); Li Yang, Guangdong (CN)

(73) Assignee: ZTE Corporation, Guangdong (CN)

( * ) Notice: Subject to any disclaimer, the term of this patent is extended or adjusted under 35 U.S.C. 154(b) by 602 days.

(21) Appl. No.: 17/214,316

(22) Filed: Mar. 26, 2021

(65) Prior Publication Data

US 2021/0235416 A1 Jul. 29, 2021

Related U.S. Application Data

(63) Continuation of application No. PCT/CN2018/108446, filed on Sep. 28, 2018.

(51) Int. Cl.
*H04W 68/02* (2009.01)
*H04W 16/28* (2009.01)
*H04W 48/16* (2009.01)

(52) U.S. Cl.
CPC ........... *H04W 68/02* (2013.01); *H04W 16/28* (2013.01); *H04W 48/16* (2013.01)

(58) Field of Classification Search
CPC ..... H04W 68/02; H04W 16/28; H04W 48/16; H04W 60/04; H04W 84/06
See application file for complete search history.

(56) References Cited

U.S. PATENT DOCUMENTS

| | | | |
|---|---|---|---|
| 5,974,314 A * | 10/1999 | Hudson | H04B 7/18558 455/427 |
| 5,974,315 A | 10/1999 | Hudson | |
| 2009/0181672 A1 | 7/2009 | Horn et al. | |
| 2012/0220214 A1 | 8/2012 | Du et al. | |
| 2014/0295837 A1* | 10/2014 | Madasamy | H04W 48/04 455/435.1 |
| 2017/0215078 A1* | 7/2017 | Mochizuki | H04W 4/90 |
| 2019/0174449 A1* | 6/2019 | Shan | H04W 60/04 |
| 2020/0077244 A1* | 3/2020 | Ahluwalia | H04W 48/16 |

(Continued)

FOREIGN PATENT DOCUMENTS

| CN | 104320831 | 1/2015 |
|---|---|---|
| CN | 106569229 A | 4/2017 |

OTHER PUBLICATIONS

EP Extended Search Report for EP Application No. 18390006.4, dated Jan. 13, 2022, 16 pages.

(Continued)

*Primary Examiner* — Kenneth T Lam
(74) *Attorney, Agent, or Firm* — Perkins Coie LLP

(57) ABSTRACT

A wireless terminal receives a network identifier in a message received on a broadcast channel. The wireless terminal determines that a mobile network code in the network identifier corresponds to a non-terrestrial network. The wireless terminal updates a tracking area list of the wireless terminal by adding or deleting a tracking area identifier corresponding to the non-terrestrial network to the tracking area list.

6 Claims, 15 Drawing Sheets

(56) References Cited

U.S. PATENT DOCUMENTS

| | | | |
|---|---|---|---|
| 2020/0178253 A1* | 6/2020 | Gao | H04L 12/4015 |
| 2021/0218467 A1* | 7/2021 | Jin | H04W 64/003 |
| 2022/0060250 A1* | 2/2022 | Xu | H04B 7/18519 |

OTHER PUBLICATIONS

Partial EP Search Report for EP Application No. 18390006.4, dated Oct. 13, 2021, 19 pages.

China Communications Standards Association (CCSA) "BMSat Radio Interface Specifications," BMSat-36.002.2 v1.0.0, 33 pages.

Co-Pending Chinese Patent Application No. 201880098213.9, dated Jan. 25, 2022, 14 pages (with unofficial translation).

Hughes, "NR-NTN: Paging in NGSO Satellite Systems," 3GPP TSG RAN1 Meeting #92 R1-1803507 Athens, Greece, Mar. 26-2, 2018, 8 pages.

Thales, "NR-NTN: Impact on Initial TA during random access procedure," 3GPP TSG RAN1 Meeting #93 R1-1806476, Busan, Korea, May 21-25, 2018, 5 pages.

ZTE, et al. "Discussion on Tracking Area Management in NTN," 3GPP TSG-RAN WG2 #103bis R2-1814243, Chengdu, China, Oct. 8-12, 2018, 6 pages.

Co-Pending Australian Patent Application Examination Report, Australian Appl. No. 2018436759, dated Jun. 29, 2022, 3 pages.

Co-Pending Korean Patent Application Notice of Allowance, Korean Appl. No. 10-2021-7011578, dated Nov. 29, 2022, 9 pages with unofficial translation.

International Search Report and Written Opinion in International Application No. PCT/CN2018/108446, mailed Apr. 28, 2019, 6 pages.

CATT. "P-CR TR24.801: Tracking Area and TAI" 3GPP TSG CT WG1 Meeting #51 C1-080088, Feb. 1, 2008 (Feb. 1, 2008), 11 pages.

CNIPA, Notification to Complete Formalities of Registration for Chinese Application No. 201880098213.9, mailed on Jun. 10, 2022, 6 pages with unofficial English translation.

Nokia et al., "Architectural key issues to be considered for NTN," 3GPP TSG RAN WG3 #101, Gothenburg, Sweden, R3-184898, Aug. 20-24, 2018, 3 pages.

Article 94 Communication for EP Application No. 18390006.4, dated Mar. 21, 2024, 6 pages.

* cited by examiner

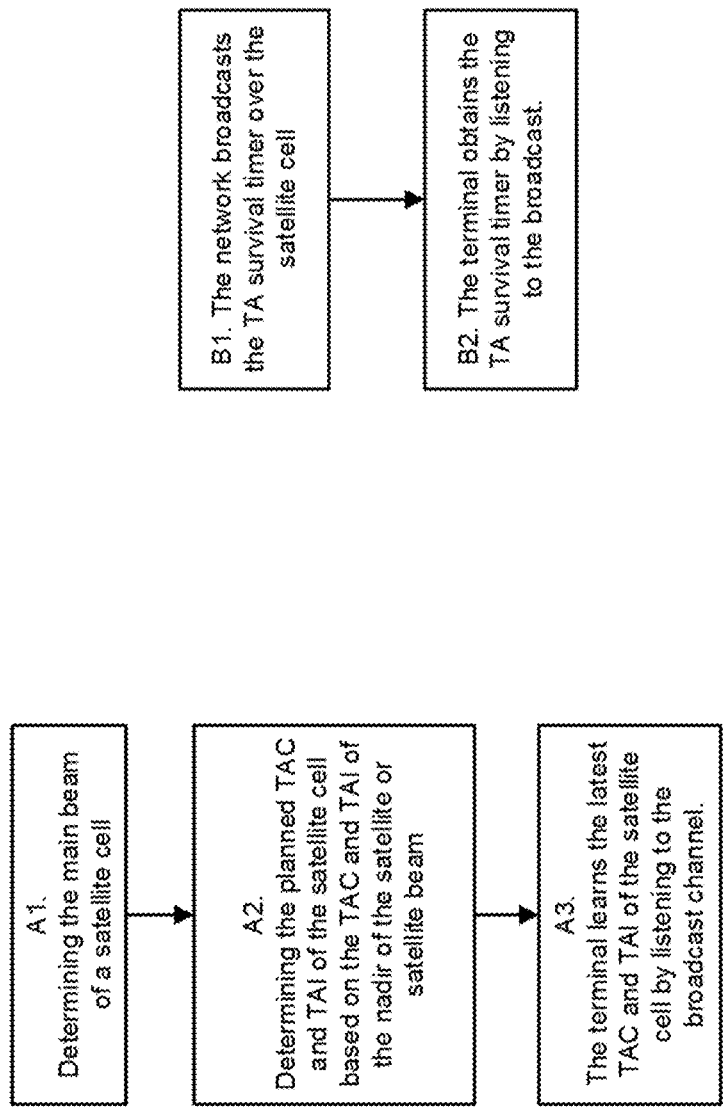

TRACKING AREA UPDATE AND PAGING METHOD FOR NON-TERRESTRIAL SATELLITE NETWORKS

CROSS-REFERENCE TO RELATED APPLICATIONS

This application is a continuation of International Patent Application No. PCT/CN2018/108446, filed on Sep. 28, 2018, the contents of which are incorporated herein by reference in their entirety.

TECHNICAL FIELD

The present document relates to wireless communications.

BACKGROUND

The integration of satellite networks and terrestrial mobile networks is a new trend in satellite communication. The effective use of cellular networks, their functional entities, signaling procedures and interfaces in satellite networks is an important part of 5G NTN (non-terrestrial network) development. It is conducive to the effective integration and unified management of satellite networks and terrestrial networks. The Tracking Area (TA) is a concept established by the terrestrial mobile network for terminal location management. When the terminal is in the idle state, the core network can know where the terminal is located based on TA. When the terminal in the idle state needs to be paged, network sends paging message in all cells with the TA known in the RA (Registration Area).

SUMMARY

The present document describes techniques that can be used in various embodiments for updating tracking area and paging user devices that are operating in non-terrestrial satellite networks.

In one example aspect, a method of wireless communication is disclosed. The method includes receiving, by a user terminal, a network identifier in message received on a broadcast channel, determining that a mobile network code in the network identifier corresponds to a non-terrestrial network, and updating a tracking area list of the user terminal by adding or deleting a tracking area identifier corresponding to the non-terrestrial network to the tracking area list.

In another example aspect, a method of wireless communication is disclosed. The method includes determining, by a network-side node, a main beam of a satellite cell. The method includes determining a location of ground projection of the main beam within a tracking area planning area. The method includes determining a current tracking area code (TAC) and a current tracking area identity (TAI) of the satellite cell based on a tracking area code and a tracking area identity at the location.

In yet another aspect, another method of wireless communication is disclosed. The method includes initializing, by a terminal device, a tracking area (TA) list, determining, by the terminal device, a suitability of a satellite cell for connectivity, receiving, by a terminal device, a TA survival timer (TA_survive) parameter and a TA identifier (TAI_n) for the satellite cell from a broadcast channel of the satellite cell, and managing, based on the TA_survive parameter, the TA list at the terminal device.

In yet another aspect, another method of wireless communication is disclosed. The method includes receiving, at a network-side node a tracking area (TA) list for a terminal device, where the TA list includes a TA identifier (TAI) for at least one satellite cell, performing a first paging of the terminal device using the TA list, determining that the first paging has failed, determining a first extended TA list update by performing a union of adjacent tracking areas for all entries in the TA list, and performing a second paging of the terminal device using the first extended TA list update.

In yet another aspect, one or more of the above-described methods may be implemented by a wireless communications apparatus that includes a processor.

In yet another aspect, the above-described methods may be embodied as processor-executable code and stored on a computer readable medium.

These, and other, features are described in the present document.

BRIEF DESCRIPTION OF THE DRAWINGS

FIG. 2 shows an example of TAC configuration or TA update of a satellite cell based on the TA planning area of the satellite ground projection location.

FIG. 3 shows an example of the configuration of TA survival timer in TA list in terminal configured by network.

DETAILED DESCRIPTION

Figure 1:
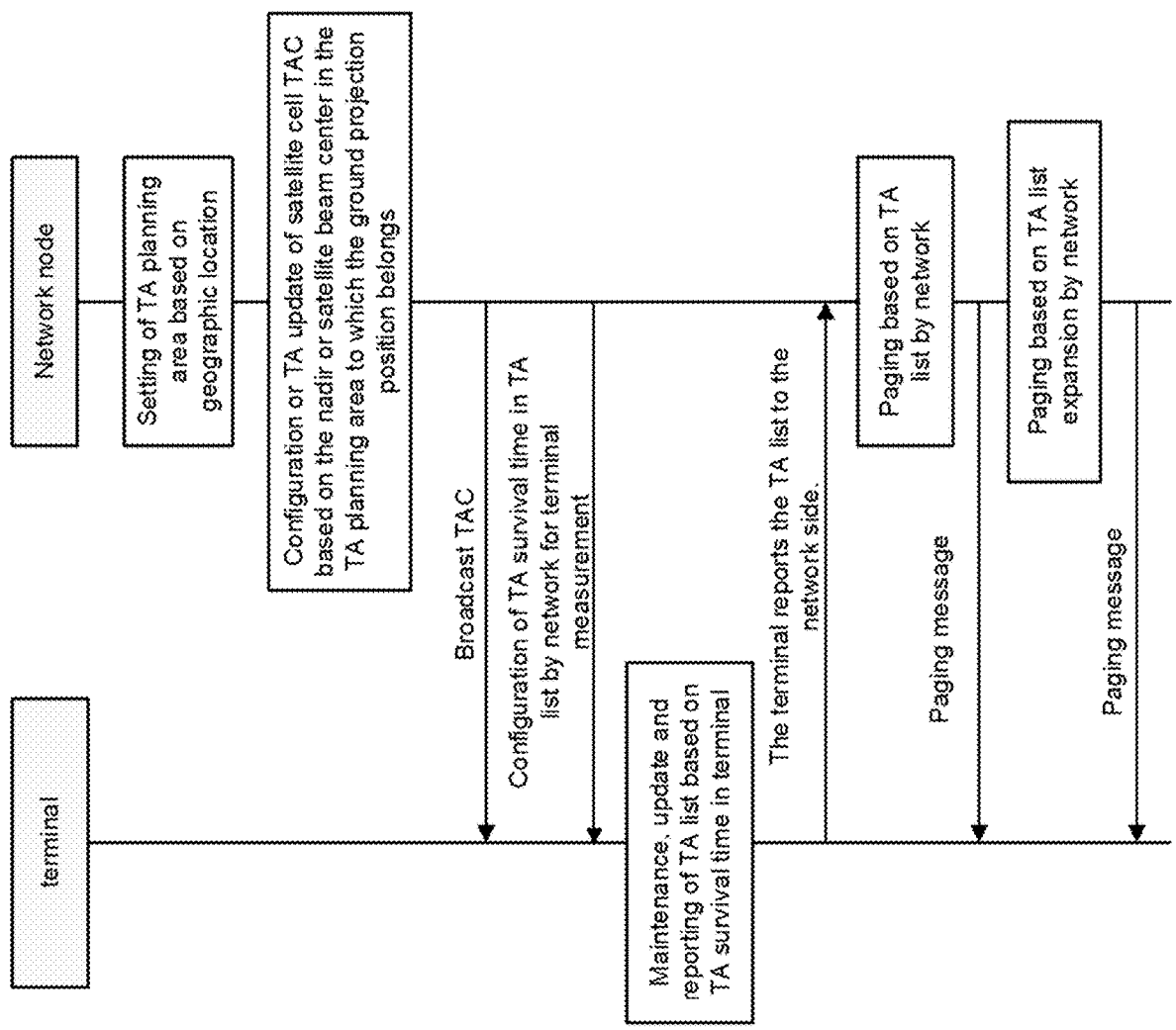
FIG. 1 depicts an example of a location update and paging method for non-terrestrial network users.

Some embodiments disclosed in the present document relate to a Tracking area (TA) setting, TA list update reporting and a network side paging terminal in a satellite mobile network.

Using the disclosed techniques, an example embodiment adopts a tracking area planning based on geographical location of nadir of a satellite or nadir of a satellite beam to perform a satellite cell tracking area configuration and broadcast update; and adopts a terminal to maintain a tracking area list and report to the network, the network side performs terminal paging based on the tracking area list; adopts a method of expanding the tracking area list for paging after the first paging failure; thereby reducing the air interface resource caused by frequent updating of the terminal tracking area in the case of satellite motion and minimizing the signaling overhead of terminal paging.

The TAI is a Tracking Area Identity of the mobile network and includes a PLMN (Public Land Mobile Network) id and a TAC (Tracking Area Code), e.g., TAI=PLMN id+TAC.

In a terrestrial mobile communication network, multiple TAs form a TA list, which is simultaneously assigned to a terminal by the network side. When the terminal moves in the TA areas in the TA list, it does not need to perform TA update to reduce frequent interaction with the network.

When the terminal enters a TA that is not in the TA list, the TA update (TAU: TA Update) procedure needs to be performed, and the network side re-allocates a set of TA lists to the terminal. The newly allocated TA list may or may not include the TAs contained in the original TA list, but each cell is allowed to belong to only one TA.

For satellite mobile communication networks, the interfaces and protocols of most systems are private protocols. When using the protocol entities, interfaces and processes of terrestrial mobile communication networks in NTN, there are two questions raised up due to the high-speed movement of satellites around the earth:
  1. Due to the high-speed movement of satellite, how to configure TA for each satellite cell?
  2. Due to the high-speed movement of the satellite, even if the terminal is stationary on the earth, the TAU frequency for terminals in the idle state is also very high. How to reduce the TAU frequency while minimizing the resource of paging?

For the question 1, if the TA is bound to the satellite, the TAU is inevitable high so that the signaling overhead caused by the global idle user terminals due to the proceeding of the TAU will be very large. It is also not conducive to the energy saving of idle user terminals; if the TA is bound to the ground, it is necessary to determine the update method of the satellite cell TA, and solve the ping-pong problem of user TAU update at the boundary of the TA planning area on the ground. In the present document, the TA planning area and the ground binding strategy are adopted, which is advantageous for greatly reducing the signaling overhead of the TAU and reducing the power consumption of the terminal.

For question 2, the terrestrial mobile communication network utilizes a reasonable TA area size and TA list to reduce TAU cost and TA area boundary user TAU ping pong problem, but in satellite mobile communication network, it needs to be considered that, due to satellite high-speed movement, TA planning area and the actual TA area are different, TA planning area is fixed, but TA area in a short period of time is geographically varying. If the similar TA list scheme as in terrestrial mobile communication network is used in NTN, the ping-pong of TA of a user at the boundary of TA Planning area can be reduced, but in another aspect, for most of the fixed user, it is not necessary. Because the satellite TA area is much larger compared to the terrestrial network, even a single satellite cell paging load is very large, and a terrestrial network TA list scheme will cause unnecessary paging resource waste.

Accordingly, in some embodiments, a method based on tracking planning area bound on ground, TA list maintenance and updating at terminal, paging and paging extension based on TA list, which can effectively reduce the cost of air interface message, reduce the waste of paging resource and improve the success rate of paging may be implemented.

Some disclosed embodiments relate to two nodes: a terminal node (also called a terminal or a user terminal in the present document) and a network-side node. The network-side node includes system equipment such as a base station and a core network; the terminal node includes but is not limited to a user mobile phone, a vehicle/board/boardborne mobile station, a relay device, and such devices.

One example method includes the following aspects:
Based on the MNC (mobile network code) to determine the type of network, such as: terrestrial or non-terrestrial;
Set the TA planning area based on the geographic location;
Configure TAC or perform TA update for a satellite cell based on TA planning area of the nadir of satellite or the nadir of satellite beam;
The survival timer is configured by network-side node to terminals for each TA being survived in TA list;
The terminal maintains, updates, and reports the TA list based on the survival timer configured by network-side node.
The network-side node performs paging delivery based on the TA list;
The network-side node performs paging delivery based on the TA list extension.

The term "geographic location" may refer to a location determined by the longitude and latitude on the surface of the earth.

The term "TA planning area" may refer to a division of geographical location areas on the earth surface, and each geographic location area corresponds to a TA planning area.

The term "nadir of a satellite" refers to the longitude and latitude corresponding to the projection of the satellite on the earth surface by connecting the satellite and earth center.

The term "nadir of a satellite beam" refer to the longitude and latitude corresponding to the intersection point on the earth surface by the center line of the satellite beam main lobe and the earth surface.

The term "satellite cell" may refer to an area covered by a physical beam composed by one or more beams of the satellite.

The term "satellite cell TAC" may refer to a tracking area code assigned by the network layer node to the satellite cell.

The term "TA update" may refer to the update of TAC of the serving satellite cell in terminal and by terminal informing network due to any reason.

The term "TA list" may refer to a TAI set composed of multiple TAIs; "TA resident TA list" means that a TAI belongs to the TA list set. The term "TA reside in TA list" refer to a TAI is included in a TA list set.

The term "survival timer" may refer to a timer parameter configured by the network-side node to determine whether a certain TA can continue to remain in the TA list; "the maintenance and update of the TA list" refers to a process of adding and deleting a TAI in the TA list.

The term "reporting of the TA list" may mean that the terminal side node notifies the network-side node of the TA list The process of paging delivery based on the TA list may include a process in which the network-side node performs paging delivery based on the TA list of the terminal in all the satellite cells included in the TA list; the network-side node performs paging based on extension of the TA list.

The process of paging delivery based on TA list extension may refer to a process in which the network-side node performs TAI addition to the TA list set on the basis of the TA list, and performs paging based on the TA list expansion set.

The determining the type of a network based on the MNC, for example, the terrestrial network or the non-terrestrial network refers to determining whether the network type is a terrestrial network or a non-terrestrial network based on the value of the MNC in the PLMN, and specifically includes: the terminal (e.g. a UE) receives the broadcast message of the cell to obtain network PLMN and compares whether the MNC is in the NTN MNC list. If the MNC is in the NTN MNC list, the network is a non-terrestrial network, otherwise it is a terrestrial network. The NTN MNC list refers to a set of MNCs specifically set for the satellite network, and the terminal is notified by the network.

The setting of the TA planning area based on the geographical location may refer to dividing the target geographical location zone into areas in a global or regional coverage mobile communication network system, so that each geographical location in the target area zone belongs to one area. Each area belongs to a tracking area and is configured with a TAC and TAI.

The configuration of TAC or TA update of the satellite cell based on nadir of satellite or nadir of satellite beam in the TA planning area is described as follows:

FIG. 2 shows steps of a method for a terminal user device or terminal to acquire TAC and TAI for a satellite cell. The method includes the following operations:

A1. Determining the main beam of the satellite cell, specifically, when the satellite cell contains only one beam, the beam is the main beam of the satellite cell; when the satellite cell contains multiple beams, a unique beam is determined by a suitable method as the main beam of the satellite cell, the suitable method includes, but is not limited to, a center based on a beam number, a maximum or minimum, a geometric center based on the all nadirs of satellite beams, and the like;

A2. Determining the planned TAC and TAI of the satellite cell based on the TAC and TAI of the nadir of satellite or nadir of satellite beam in the TA planning area; if the planned TAC and TAI are inconsistent with the current TAC and TAI of the satellite cell, the satellite cell needs to update TAC and TAI on the broadcast channel. This step may be used for updating the TAI/TAC of the satellite cell based on the TA planning area. In some cases, an old, or previously being used, TAC/TAI is broadcast in the satellite cell, when satellite moves out of the boundary of the previous TAI planning area with the old TAI/TAC still being broadcast by the satellite, a new TAI/TAC that is consistent with the TA planning area is thus used in satellite cell to replace the old one.

A3. Learning the latest TAC and TAI of the satellite cell by listening to a broadcast channel.

As depicted in FIG. 3, in some embodiments, a terminal may acquire the survival timer as follows. The process of survival timer of the network configuration for the terminal to configure the TA-camping TA list includes:

B1. The network side broadcasts the survival timer for TA camping in the satellite cell, and the configuration method of survival timer includes, but is not limited to, considering the orbit parameter, beam parameter, satellite motion speed, earth beam footprint coverage size, TA planning of the satellite, area, etc.

B2. The terminal obtains the TA survival timer–T_survive by listening to the broadcast.

Figure 4:
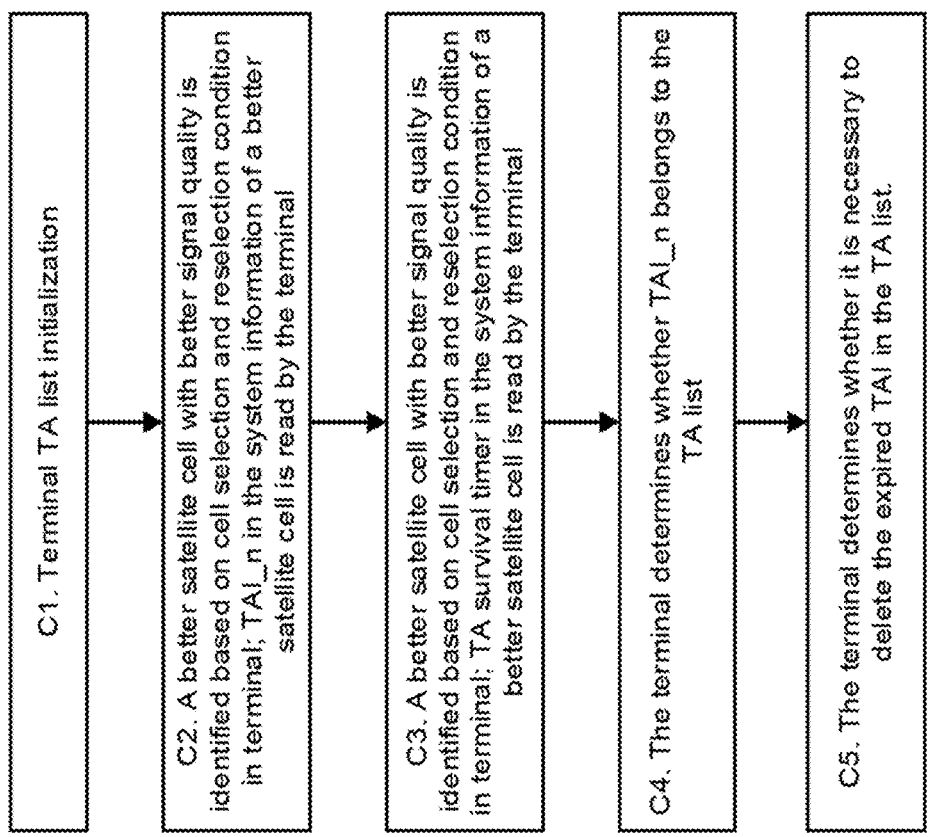
FIG. 4 shows an example process by which a terminal maintains, updates, and reports the TA list based on the survival timer parameters.

The terminal maintains, updates, and reports the TA list based on survival timer. One example process, as depicted in FIG. 4, may include the following steps:

C1. Terminal TA list initialization: After the terminal is powered on, the TA list is initialized based on the TAI_s broadcast by satellite cell, specifically, the TAI_s is included in the TA list;

C2. The terminal measures and identifies the suitable satellite cell with better signal quality based on the cell selection and reselection conditions or based on the satellite ephemeris information and the geographical location information of the terminal, or other methods. The TAI_n of the suitable satellite cell in the broadcast information is received by terminal;

C3. The terminal measure and identify the suitable satellite cell with better signal quality based on the cell selection and reselection conditions or based on the satellite ephemeris information and the geographical location information of the terminal, or other methods. The T_survive of the suitable satellite cell in the broadcast information is received by terminal;

C4. The terminal determines whether TAI_n belongs to TA list:

If the TAI_n is not in the TA list, the TAI_n is added in the TA list set, and it is determined whether the TAI_i of all non-TAI_n in the new TA list set has started the corresponding timer Timer_i, and if the timer Timer_i is not started, start the corresponding timer Timer_i; the terminal reports the new TA list to the network side through the tracking area update procedure and related messages; after receiving the tracking area update message, the network side needs to update the TA list data of the terminal stored on the network side;

If TAI_n is already in the TA list, reset the timer Timer_n corresponding to TAI_n to 0 and stop;

C5. The terminal determines whether it is necessary to delete the expired TAI in the TA list.

For all TAIs that have started the relevant timers in the TA list, it is necessary to monitor whether the related timer expires. If the timer Timer_i of a certain TAI_i has expired, that is, when Timer_i>=T_survive, the Timer_i expires, and the TA needs to be updated. List and delete the relevant TAI_i and the corresponding expired Timer_i from the TA list, and the terminal needs to report the latest TA list to the network side through the tracking area update process and related messages; after receiving the tracking area update message, the network side needs to update the TA list data of the terminal in network database.

Figure 5:
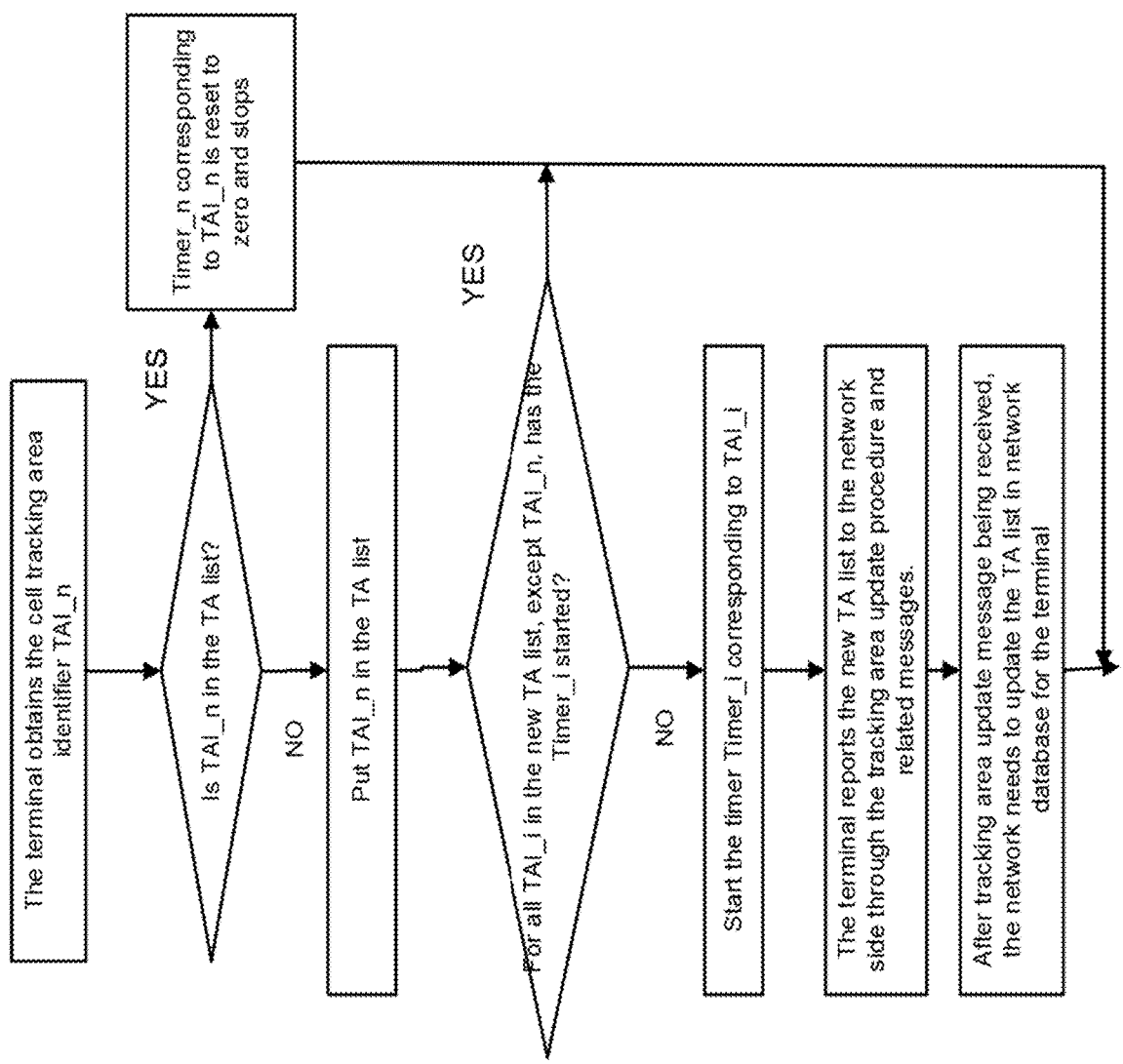
FIG. 5 shows an example of a process by which a terminal determines whether TAI_n belongs to a TA list.

FIG. 5 depicts a flowchart which depicts an example method of terminal updating TA lists. Starting from the top, terminal obtains the cell tracking area identifier TAI_n for the satellite cell. If TAI_n is not in the list, then TAI_n is added to the TA list. Next, a judgment is made about whether timers for each TAI_n have started, and if not, they are started. Next, the newly added TAI_n is reported to the network side through a tracking area update procedure and related messages are transmitted or received. After receiving the tracking area update message, the network-side node will update the TA list stored for that terminal on the network-side.

If, TAI_n was already in the list, then the timer corresponding to the TAI_n is stopped and reset to zero. The updating process then concludes.

Figure 6:
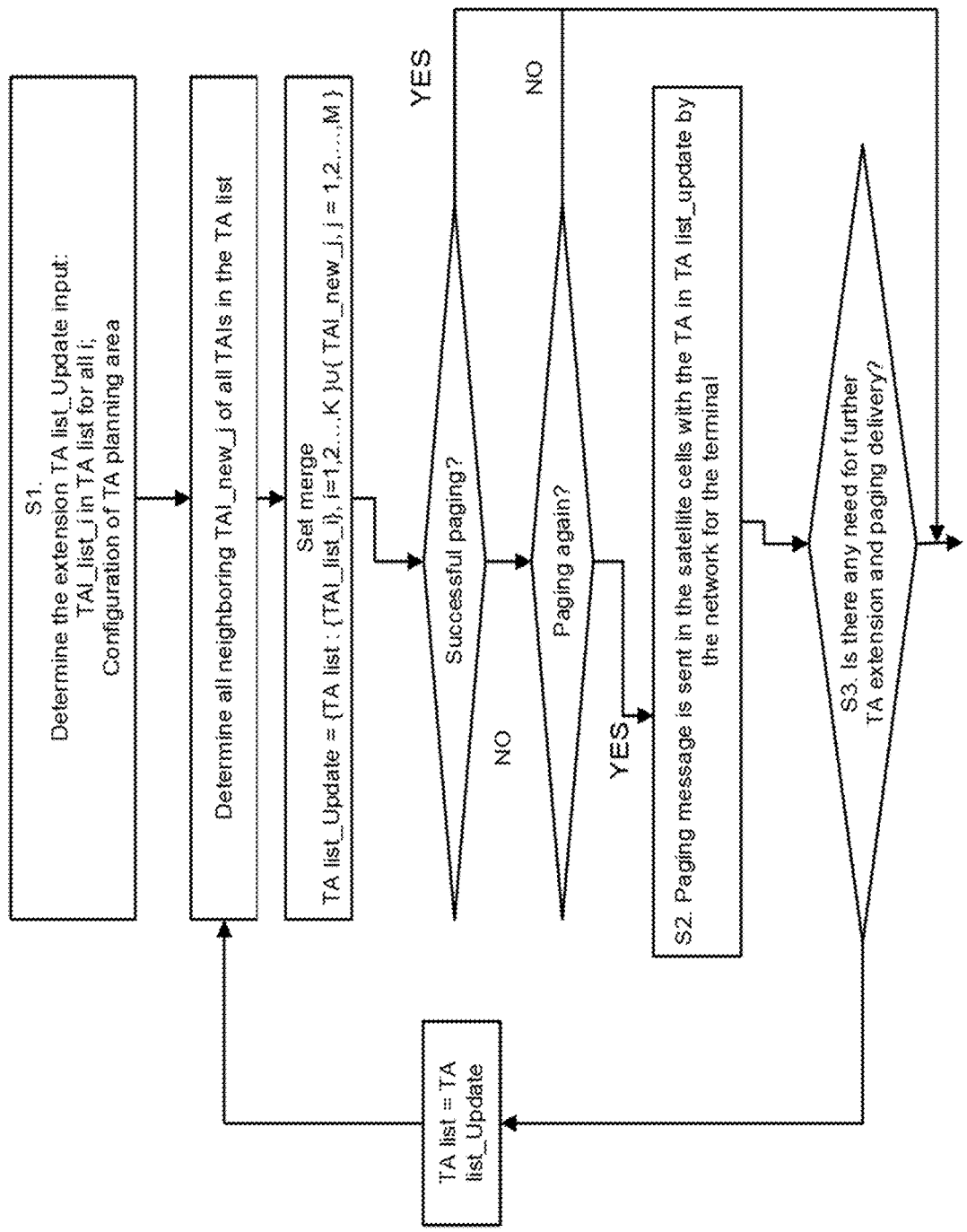
FIG. 6 shows an example process for terminal paging by a network-side node based on TA list expansion of terminal.

As depicted in FIG. 6, one example method for sending of the paging based on the TA list by the network includes:

The network needs to send a paging message based on the satellite cell group to which the TA belongs in the TA list of the terminal when the downlink data is delivered or the requirement for calling a terminal.

The network side performing paging delivery based on the TA list extension.

After the first paging failure based on the TA list, the TA list needs to be extended based on the existing TA list. The specific method is as follows:

S1. Determine the first extended TA list_Update: Determine all adjacent TAI adjacent tracking areas TAI_new_j, i=1, 2 . . . , K, j=1, 2, . . . , M based on all TAI_list_i and TA planning area information in the TA list. Where K is the number of TAIs in the TA list, M is the number of TAIs in all adjacent tracking areas, and the two sets are merged: TA list_Update={TA list: {TAI_list_i}, i=1, 2 . . . , K}∪{TAI_new_j, j=1, 2, . . . , M}.

S2. Performing a second paging: the network needs to send a paging message based on the satellite cell group to which the TA belongs in the TA list_Update of the terminal.

S3. Performing subsequent multiple paging: When the last paging fails again, the TA list=TA list_Update may be set based on the method of S1, and the TA list_Update is updated again, and the network needs to sent paging message in the satellite cell group to which the TA belongs based on the TA list_Update of the terminal. The execution of this step can be performed zero times, once or multiple times, and the entire network can be optionally selected at any stage in the process.

Example Embodiment 1

Consider a low-earth-orbit satellite constellation, the relevant parameters are shown in Table 1:

TABLE 1

Low-orbit satellite constellation parameter configuration

| Parameter | Unit | Configuration 1 |
|---|---|---|
| Orbit type | — | near polar orbit (circle, π-type constellation) |
| Orbital inclination | degree | 86.4 |
| Number of orbit: P | — | 16 |
| Number of satellites per orbit: S | — | 36 |
| Total number of satellites | — | 576 |
| Return orbit M | — | 1 |
| Return orbit N | — | 13 |
| Satellite latitude(Nadir) | km | 1255.2 |
| Phase difference between orbits | degree | 3.9477 |
| Distance between the edge of the coverage and satellite | km | 1618.1 |
| Carrier frequency | GHz | 20 |
| Carrier bandwidth | MHz | 250 |
| Number of beams | — | 16 |
| Forward link transmit power in service link | dBW | 3 |
| Satellite point beam EIRP | dBW | 22.4 |
| Satellite point beam HPBW (η = 0.55) | degree | 10 |
| Terminal G/T | dB/K | 10 |
| Terminal NF | dB | 3 |
| T0 | K | 290 |

Figure 7:
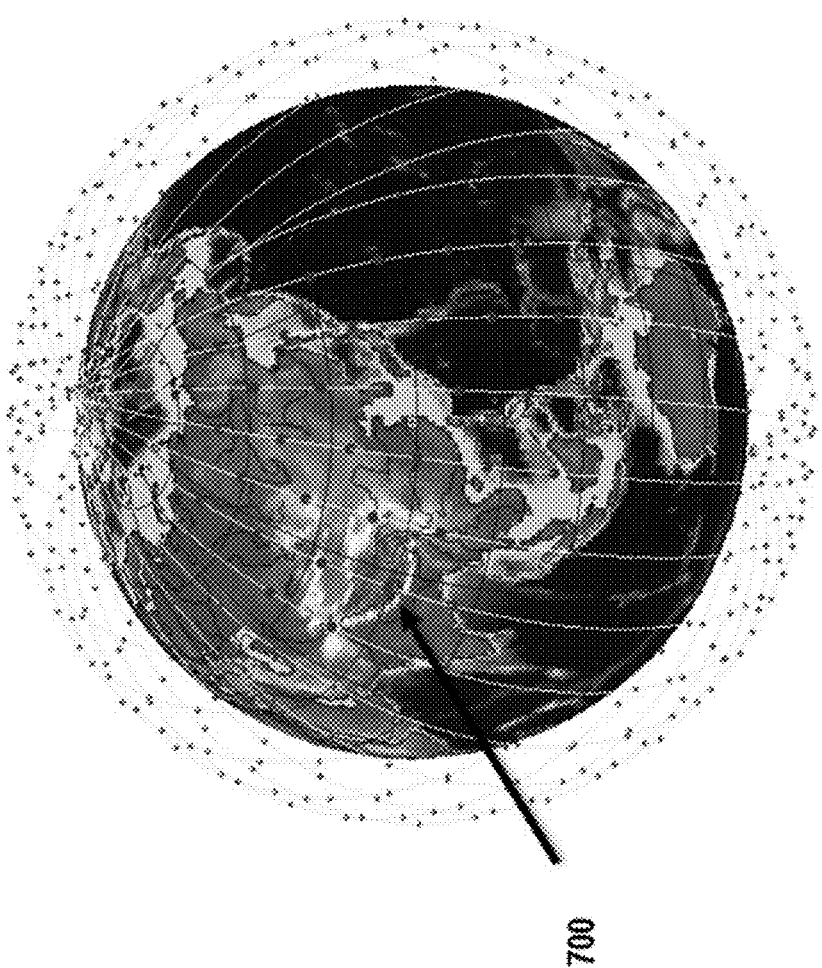
FIG. 7 illustrates global distribution of low-earth-orbit satellite constellations.

The satellite distribution is shown in FIG. 7. The dot 700 indicates an example of a visible satellite at [121 degrees east longitude, 31 degrees north latitude].

Figure 8:
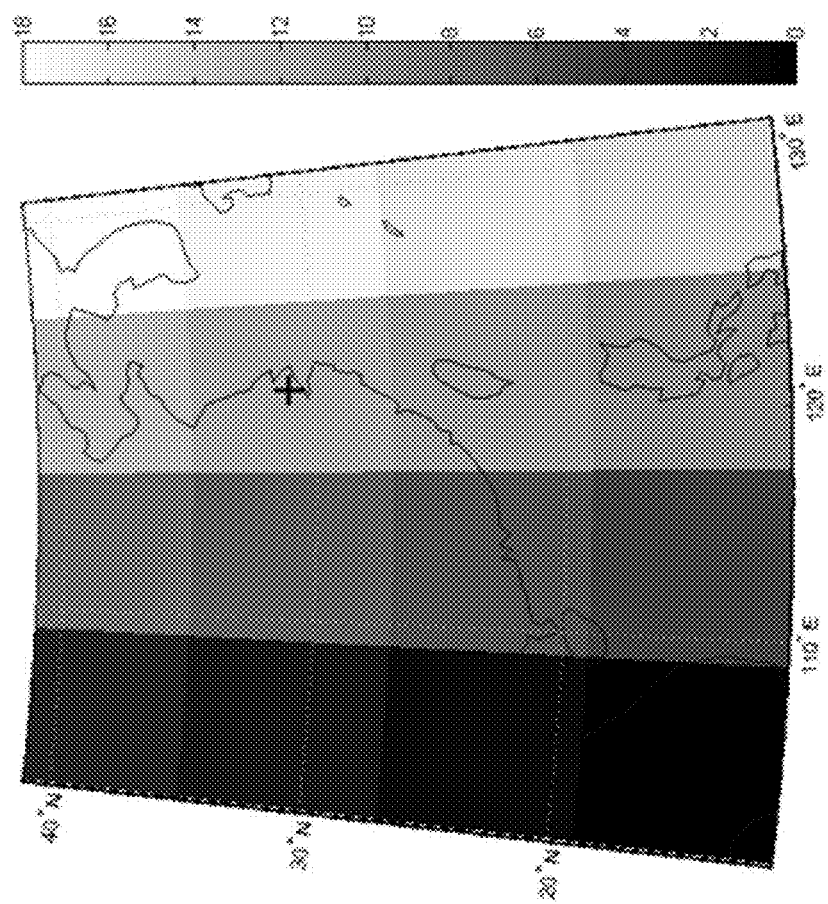
FIG. 8 shows examples of TA planning area configuration and location point [121 degrees east longitude, 31 degrees north latitude].

Consider the TA planning area near the location point [121 degrees east longitude, 31 degrees north latitude] [11 degrees north latitude-41 degrees north latitude; 101 degrees east longitude-131 degrees east longitude], as shown in FIG. 8. The grayscale image provides an approximate relation to the signal strength received in each rectangular (trapezoidal) section of geography, as indicated by scale on the right.

Figure 9:
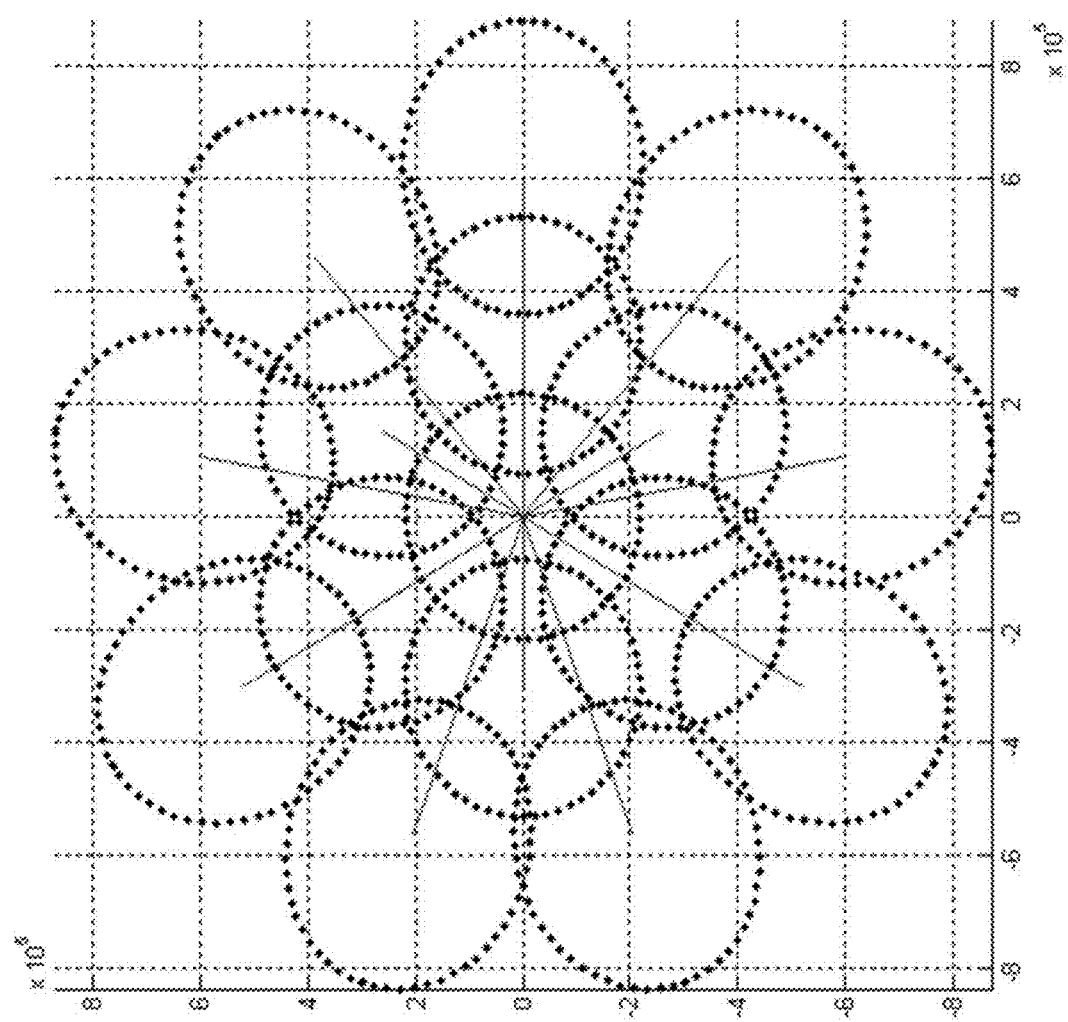
FIG. 9 shows an example of a satellite beam projection on the ground and a satellite beam main lobe centerline.

An example of the projection of the satellite beam on the ground is shown in FIG. 9. The beams are shown as multiple beams, each having an approximately circular or progressively oblate footprint. The X and Y axes represent physical dimensions in meters.

Figure 10:
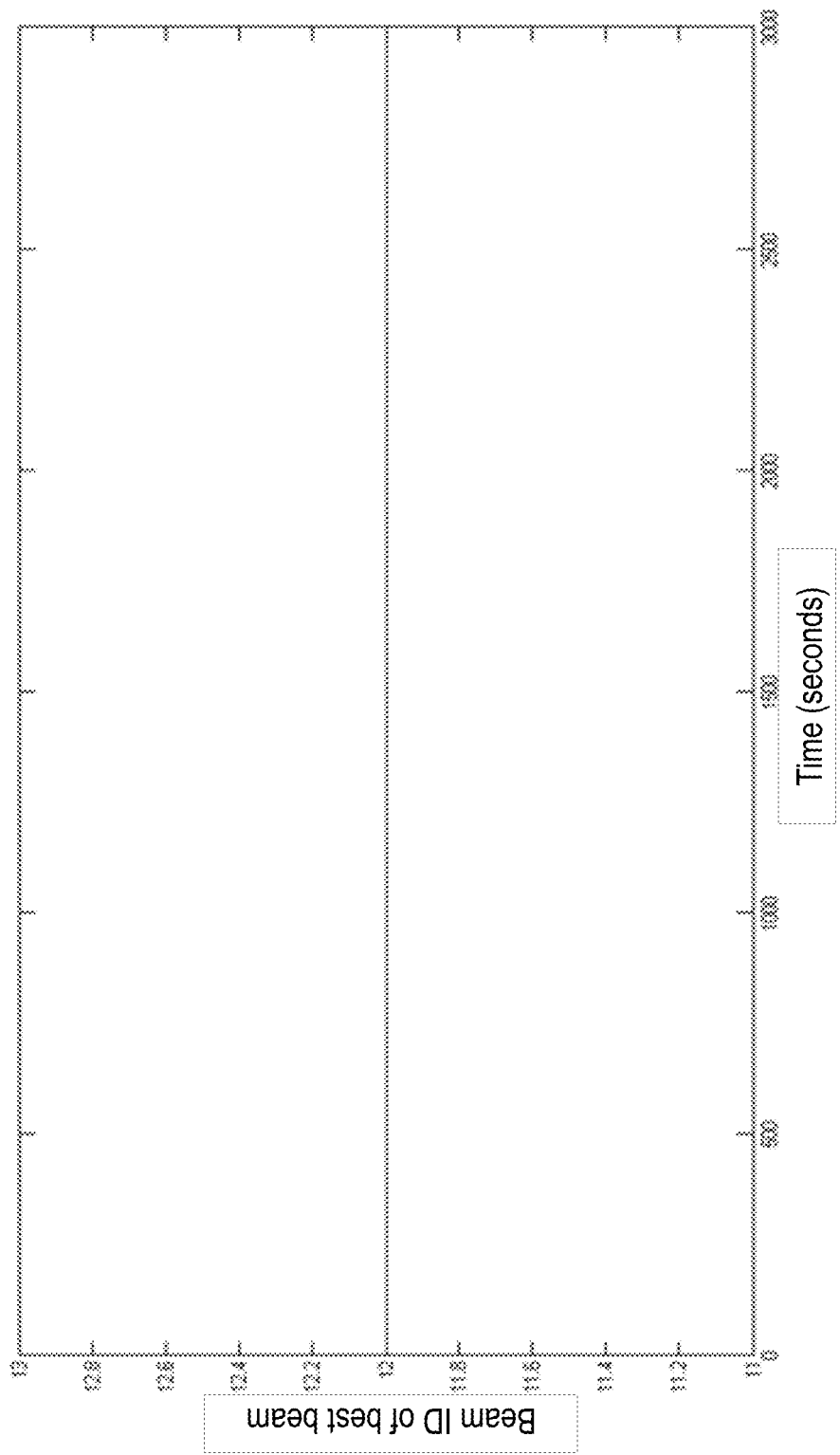
FIG. 10 is a graph showing results of the selection of serving satellites and serving beams based on the received signal strength level: [121 degrees east longitude, 31 degrees north latitude], in one implementation.

For the geographic location point [121 degrees east longitude, 31 degrees north latitude], the result of optimally selecting the serving satellite and the service beam based on the receiving level is as shown in FIG. 10. Here, the vertical axis represents ID of the best beam tracking area, and horizontal axis represents time in seconds.

In this embodiment, the terminal reports TA list={12} to the network side through the air interface message only when the first access is performed, and the network side stores the TA list of the terminal, and when the terminal needs to be paged, the paging message is delivered in the cells/beams with the TAs in the TA list.

Example Embodiment 2

Figure 11:
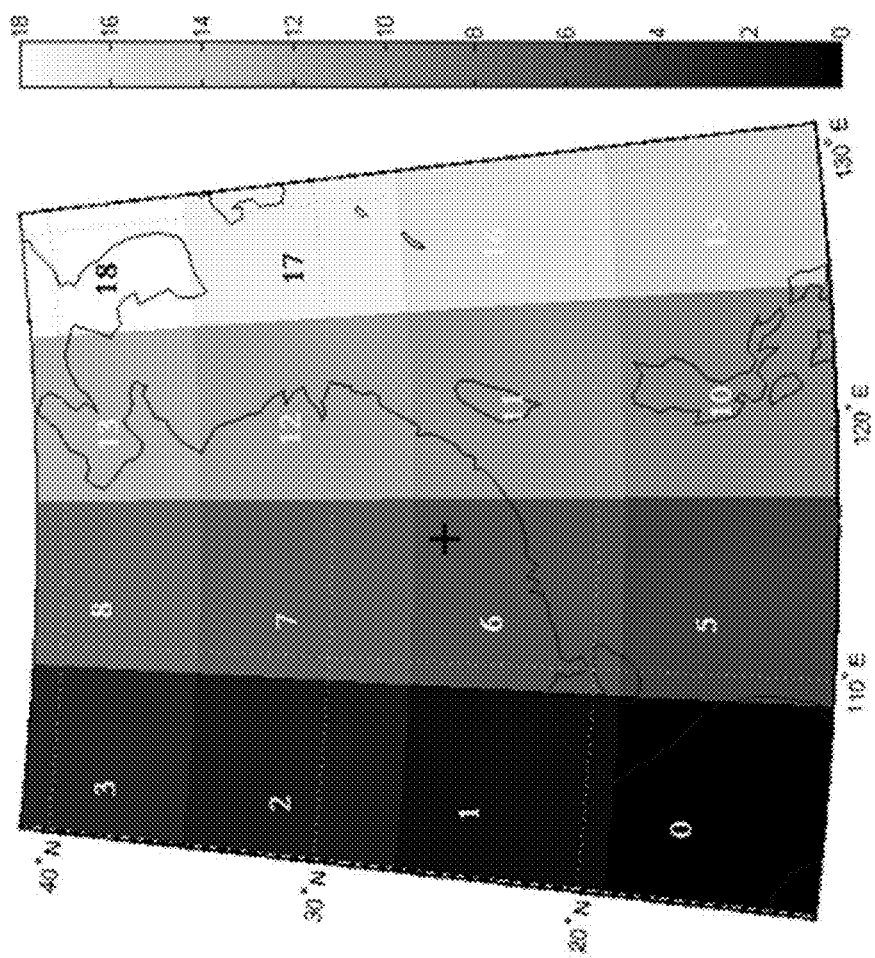
FIG. 11 shows an example of TA planning area configuration and location point [116 degrees east longitude, 26 degrees north latitude].

On the basis of the first embodiment, the terminal position is changed: [east longitude 116 degrees, north latitude 26 degrees], as shown in FIG. 11, and T_survive=1000 s is set, the terminal TA list and the reporting situation are as follows, and reference is made to FIG. 12.

At 0 seconds, TA list={6}, the terminal reports the TA list to the network side;

In 270 seconds, TA list={6, 11}, the terminal reports the TA list to the network side;

In 360 seconds, TA list={6, 11, 7}, the terminal reports the TA list to the network side;

In 1650 seconds, TA list={6, 11, 7, 12}, the terminal reports the TA list to the network side;

In 2650 seconds, TA list={6, 11, 7}, the terminal reports TA list to the network side.

Figure 12:
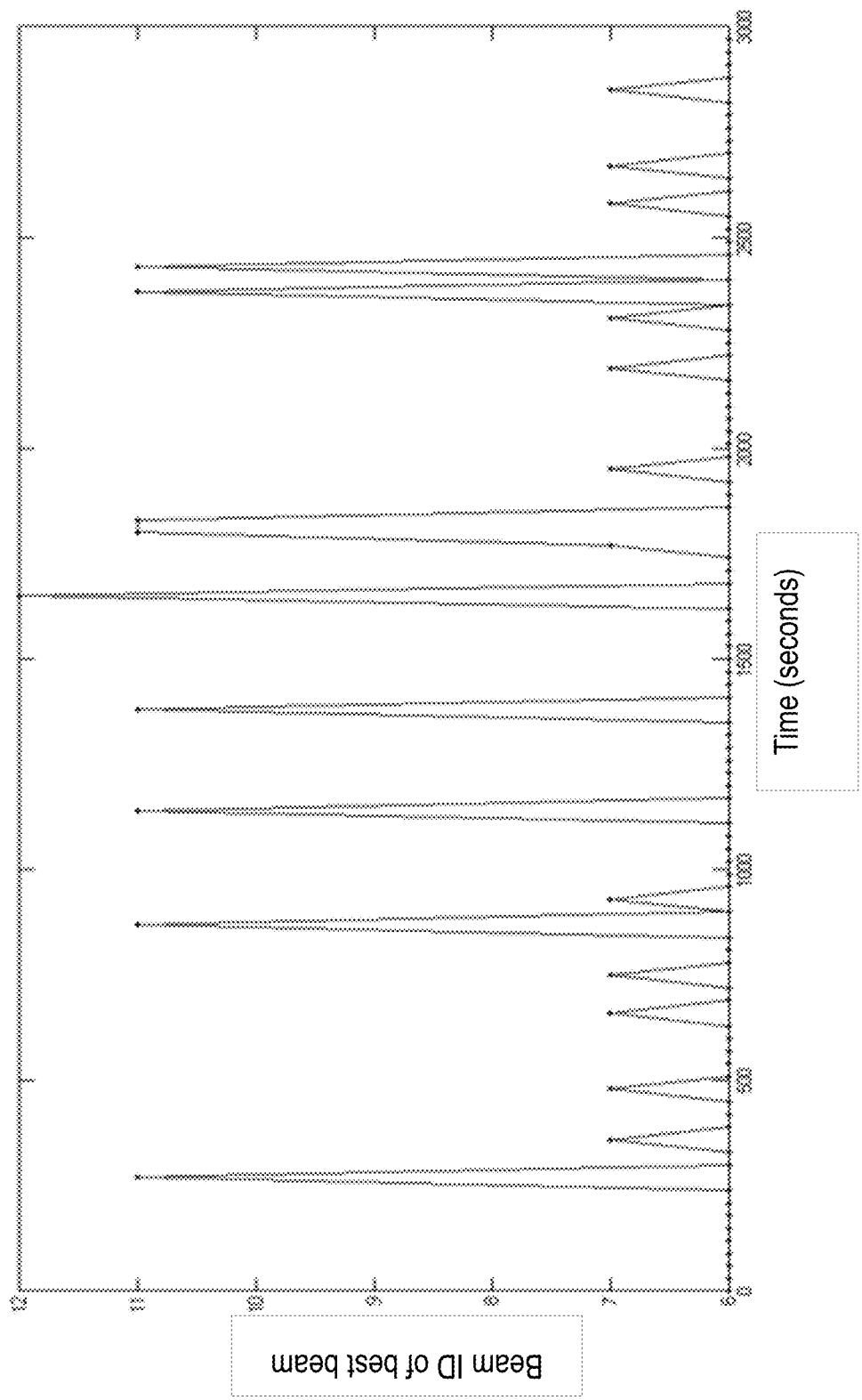
FIG. 12 shows an example of results of optimal selection of service satellites and service beams based on reception level: [116 degrees east longitude, 26 degrees north latitude].

FIG. 12 shows results of optimal selection of service satellites and service beams based on reception level: [116 degrees east longitude, 26 degrees north latitude].

It can be seen that using the techniques described herein, embodiments may issue only four messages in the first 3000 seconds of the terminal camping network, which is much lower than the TAU scheme being used in the terrestrial network.

Example Embodiment 3

For the terminal location is [116 degrees east longitude, 26 degrees north latitude], when paging the terminal at No. 2800 second, it needs to be delivered in the cells/beams to which TA list={6, 11, 7} belongs, for any reason when the paging is unreachable, the first expansion of the TA list needs to be performed based on the TA planning area shown in FIG. 11, and the expanded TA list_Update={0, 1, 2, 3, 5, 6, 7, 8, 10, 11, 12, 15, 16, 17}, the paging message needs to be sent in the cell/beam to which the TA list_Update belongs.

Figure 13:
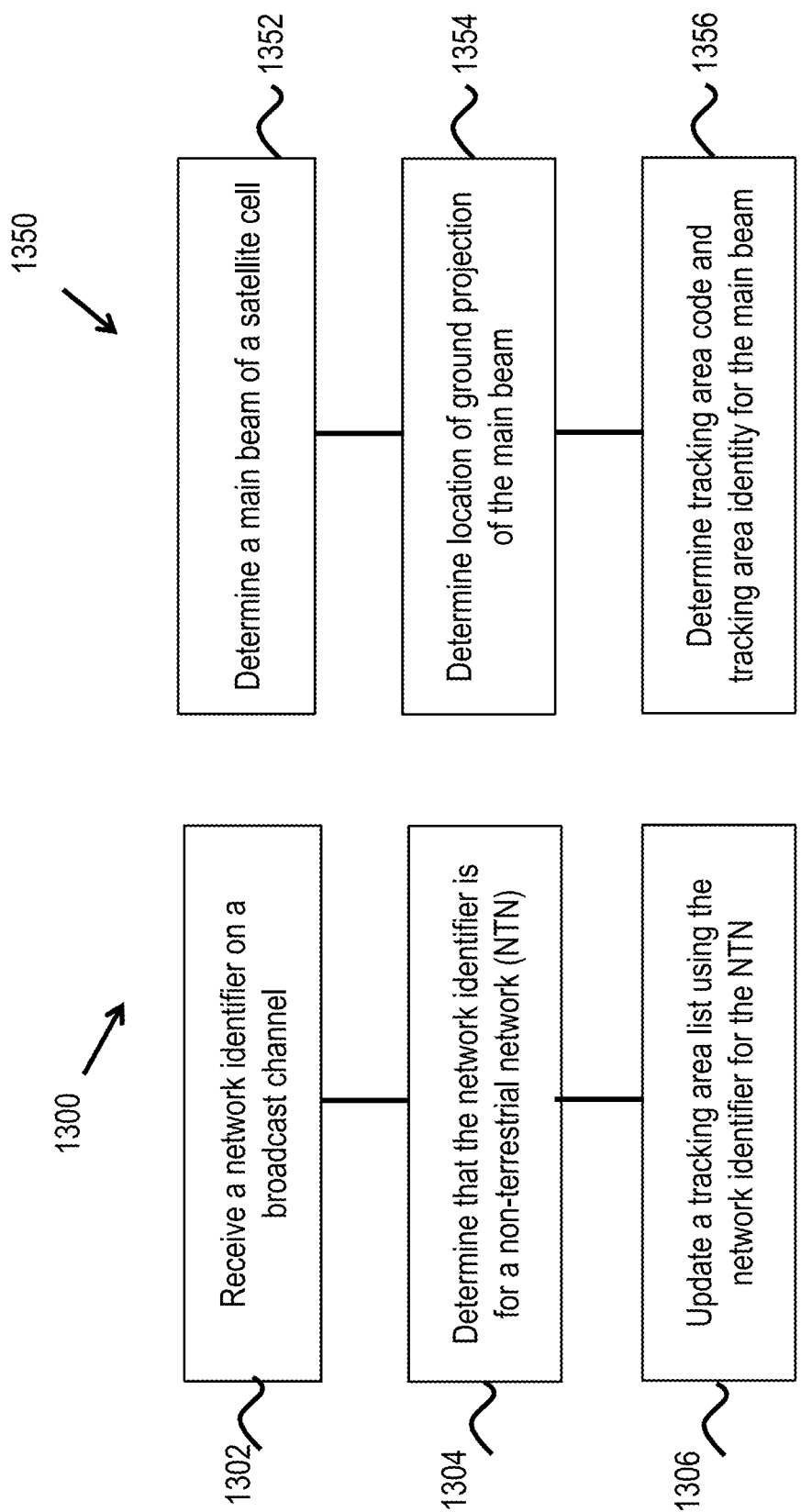
FIG. 13 shows flowchart representations of example methods of wireless communication.

FIG. 13 depicts flowcharts for methods 1300 and 1350 of wireless communication.

The method 1300 includes receiving (1302), by a user terminal, a network identifier in a message received on a broadcast channel, determining (1304) that a mobile network code in the network identifier corresponds to a non-terrestrial network, and updating (1306) a tracking area list of the user terminal by adding or deleting a tracking area identifier corresponding to the non-terrestrial network to the tracking area list. For example, the non-terrestrial network is a satellite cell. The method 1300 may further include communicating the updated tracking area list to a network-side node.

The method 1350 includes determining (1352), by a network-side node, a main beam of a satellite cell, (1354) determining a location of ground projection of the main beam within a tracking area planning area, and determining (1356) a tracking area code (TAC) and a tracking area identity (TAI) of the satellite cell based on a tracking area code and a tracking area identity at the location. In some embodiments, the method 1350 may further include transmitting, on a broadcast channel, a message that includes information about the TAC and the TAI for the satellite cell.

In some embodiments, the determining the main beam includes determining, for multiple beams of the satellite cell, a center based on beam number of the multiple beams. Alternatively, or in addition, the determining the main beam includes determining, for multiple beams of the satellite cell, a maximum strength beam.

The method 1350 may further include determining that the TAC and the TAI for the satellite cell are inconsistent with a current TAC and a current TAI being transmitted by the satellite cell, and causing an update to a tracking area message sent on a broadcast channel of the satellite cell.

Figure 14:
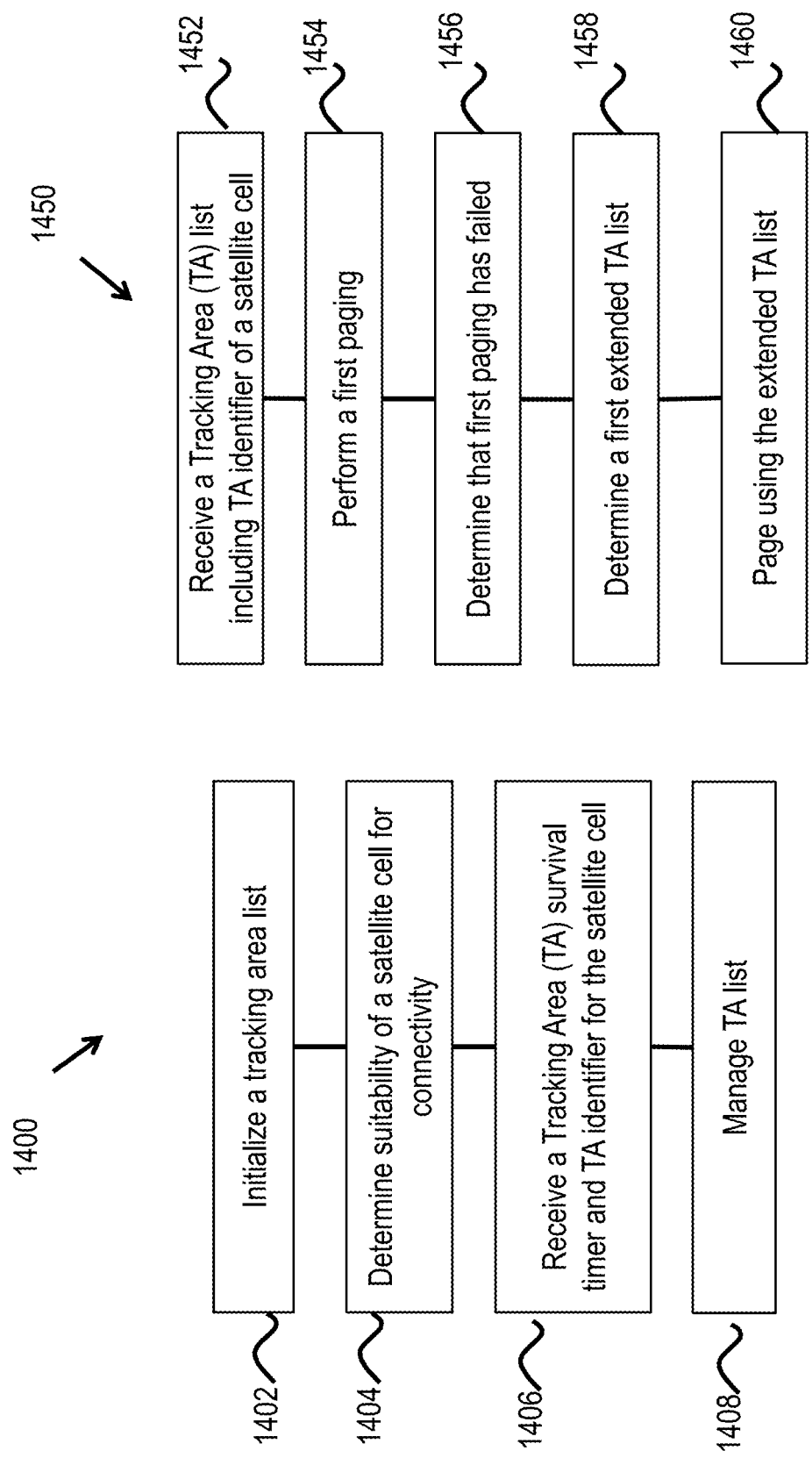
FIG. 14 shows flowcharts for additional wireless communication methods.

FIG. 14 is a flowchart representation of wireless communications methods 1400 and 1450. The method 1400 may be implemented by a user device or a terminal device.

The method 1400 includes initializing (1402), by a terminal device, a TA list, determining (1404), by the terminal device, a suitability of a satellite cell for connectivity, receiving (1406), by a terminal device, a TA_survive parameter and a TA identifier (TAI_n) for the satellite cell from a broadcast channel of the satellite cell, and managing (1408), based on the TA_survive parameter, the TA list at the terminal device.

The operation of 1408 managing the TA list may include starting a countdown timer at the TA_survive value and updating the TA list based to include the TAI_n. In some embodiments, the managing operation of the TA list includes resetting a countdown timer to the TA_survive value. This may be performed by counting down the countdown timer; and updating, upon the countdown timer reaching zero, the TA list to exclude the TAI_n. In some embodiments, the method 1400 may further include transmitting, by a terminal device, information indicative of the updating of the TA list. In some embodiments, the suitability of the satellite cell for connectivity is determined based on a signal quality of the satellite cell or ephemeris and terminal location.

The method 1450 may be implemented at a network-side device such as a base station or a mobility management function. The method 1450 may include receiving (1452), at a network-side node, a tracking area (TA) list for a terminal device, wherein the TA list includes a TA identifier (TAI) for at least one satellite cell, performing (1454) a first paging of the terminal device using the TA list, determining (1456) that the first paging has failed, determining (1458) a first extended TA list update by performing a union of adjacent tracking areas for all entries in the TA list, and performing (1460) a second paging of the terminal device using the first extended TA list update. In some embodiments, the method 1450 may further include determining that the second paging has failed, and performing additional paging of the terminal device by first updating and extending a currently used TA list for the terminal device followed by paging using the extended TA list. In some embodiments, the additional paging bay be extended until includes paging an entire network.

Additional examples and implementations of the methods 1300, 1350, 1400 and 1450 are described with respect to FIGS. 1 to 6.

Various embodiments of the above-described methods 1300, 1350, 1400 may further be described using the following clause-based description:

1. A method of wireless communication, including: receiving, by a user terminal, a network identifier in a message received on a broadcast channel; determining that a mobile network code in the network identifier corresponds to a non-terrestrial network; and updating a tracking area list of the user terminal by adding or deleting a tracking area identifier corresponding to the non-terrestrial network to the tracking area list.

Figure 16:
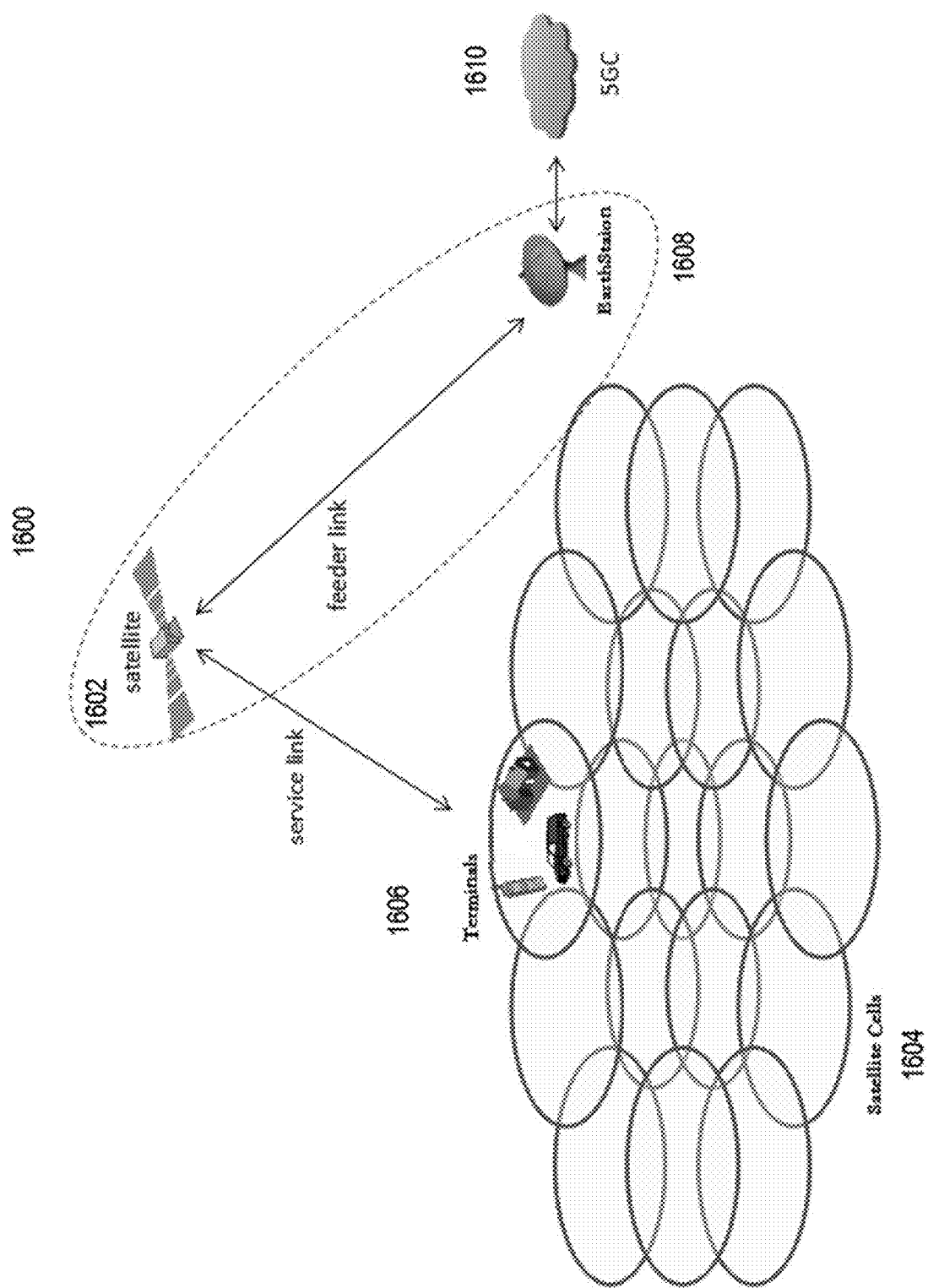
FIG. 16 shows an example of a non-terrestrial network.

2. The method of clause 1, wherein the non-terrestrial network includes one or more of the following: (1) a satellite cell, (2) a service link, (3) a satellite, (4) a feeder link, (5) an earth station, (6) a gateway and (7) a core network. For example, FIG. 16 shows one configuration example of a non-terrestrial network.

3. The method of clause 1, further including communicating the updated tracking area list to a network-side node.

4. A method of wireless communication, comprising: determining, by a network-side node, a main beam of a satellite cell; determining a location of ground projection of the main beam within a tracking area planning area; and determining a tracking area code (TAC) and a tracking area identity (TAI) of the satellite cell based on a tracking area code and a tracking area identity at the location.

5. The method of clause 4, further including: transmitting, on a broadcast channel, a message that includes information about the TAC and the TAI for the satellite cell.

6. The method of any of clauses 4 or 5, where the determining the main beam includes determining, for multiple beams of the satellite cell, a center based on beam numbers of the multiple beams or a geometric center based on the all nadirs of satellite beams.

7. The method of any of clauses 4 or 5, where the determining the main beam includes determining, for multiple beams of the satellite cell, a maximum strength beam.

8. The method of any of clauses 4 to 7, further including: determining that the TAC and the TAI for the satellite cell are inconsistent with a current TAC and a current TAI being transmitted by the satellite cell; and causing an update to a tracking area message sent on a broadcast channel of the satellite cell.

9. A method of wireless communication, comprising: initializing, by a terminal device, a tracking area (TA)

list; determining, by the terminal device, a suitability of a satellite cell for connectivity; receiving, by a terminal device, a TA survival timer (TA_survive) parameter and a TA identifier (TAI_n) for the satellite cell from a broadcast channel of the satellite cell; and managing, based on the TA_survive parameter, the TA list at the terminal device.

10. The method of clause 9, where the managing the TA list includes: starting a countdown timer at a value of the TA_survive parameter; and updating the TA list to include the TAI_n.

11. The method of clause 9, where the managing the TA list includes: resetting a countdown timer to the value of the TA_survive parameter.

12. The method of clause 10, further including: counting down the countdown timer; and updating, upon the countdown timer reaching zero, the TA list to exclude the TAI_i with timer expired.

13. The method of any of clauses 10 or 12, further including transmitting, by a terminal device, information indicative of the updating of the TA list.

14. The method of clause 9, wherein the suitability of the satellite cell for connectivity is determined based on a signal quality of the satellite cell or ephemeris and terminal location.

15. A method of wireless communication, comprising: receiving, at a network-side node a tracking area (TA) list for a terminal device, wherein the TA list includes a TA identifier (TAI) for at least one satellite cell; performing a first paging of the terminal device using the TA list; determining that the first paging has failed; determining a first extended TA list update by performing a union of adjacent tracking areas for all entries in the TA list; and performing a second paging of the terminal device using the first extended TA list update.

16. The method of clause 15, further including: determining that the second paging has failed; and performing additional paging of the terminal device by first updating and extending a currently used TA list for the terminal device followed by paging using the extended TA list.

17. The method of clause 16, wherein the performing additional paging includes paging an entire network.

18. A wireless communication apparatus (e.g., as depicted in FIG. 15) comprising a processor configured to implement a method recited in any one or more of clauses 1 to 17.

19. A computer readable medium having code stored thereon, the code comprising processor-executable instructions to implement a method recited in any one or more of clauses 1 to 17.

Figure 15:
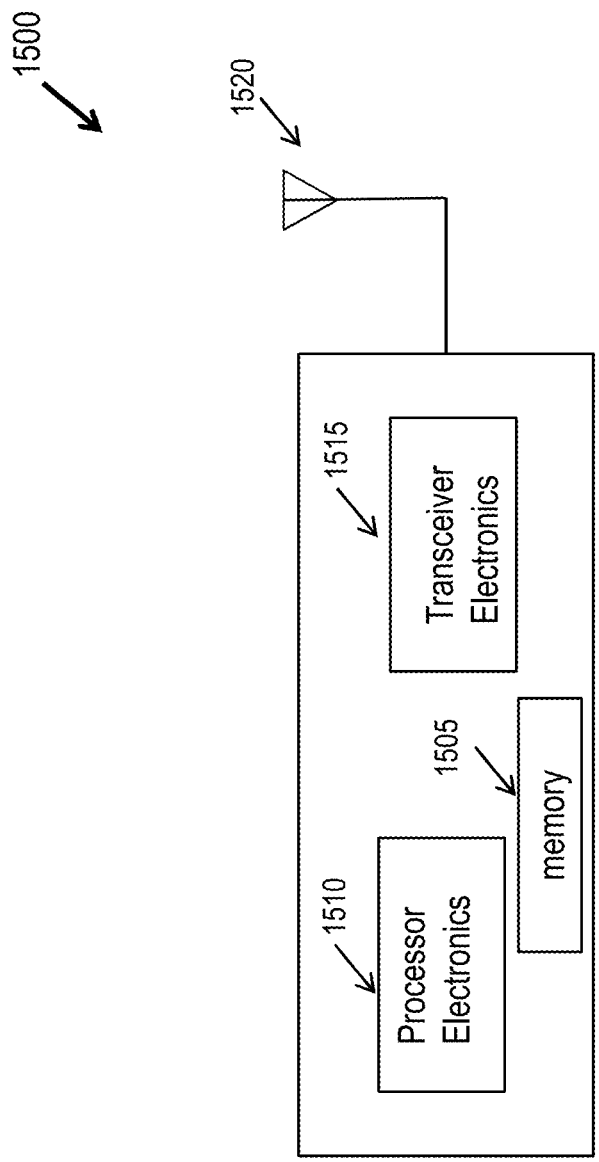
FIG. 15 is a block diagram showing an example embodiment of a wireless communication device.

FIG. 15 depicts a block diagram representing a portion of a radio station 1505. A radio station 1505 such as a base station or a wireless device (or UE) can include processor electronics 1510 such as a microprocessor that implements one or more of the wireless techniques presented in this document. The radio station 1505 can include transceiver electronics 1515 to send and/or receive wireless signals over one or more communication interfaces such as antenna 1520. The radio station 1505 can include other communication interfaces for transmitting and receiving data. Radio station 1505 can include one or more memories (not explicitly shown) configured to store information such as data and/or instructions. In some implementations, the processor electronics 1510 can include at least a portion of the transceiver electronics 1515. In some embodiments, at least some of the disclosed techniques, modules or functions are implemented using the radio station 1505.

FIG. 16 shows an example wireless communications network 1600 that includes NTN. The network 1600 includes a satellite 1602 and multiple user devices 1606 being able to communicate with the satellite 1602 via a wireless service link. The terminals 1606 may be operating in the network 1600 that includes one or more satellite cells 1604 with their corresponding coverage footprints. The satellite 1602 may be communicatively connected with an earth station 1608 via a feeder link. The feeder link may carry messages to/from the terminals 1606 being served by the satellite 1602. The earth station 1608 may be communicatively connected with a core wireless network such as a 5G core network 1610. Accordingly, messages to the terminals 1606 from the 5GC network may travel over the earth station to the satellite, and then from the satellite to the terminal. Similarly, messages from the terminal may travel over the service link to the satellite, then from the satellite over feeder link to the earth station, and then from the earth station to the 5GC network. The satellite 1602 and the terminals 1606 may be configured to implement techniques described in the present document.

It will be appreciated by one of skill in the art that a configuration and identification method for non-terrestrial network types based on PLMN has been disclosed.

It will further be appreciated that a method for configuring or TA updating the satellite cell TAC based on the sub-satellite point or the satellite beam center in the TA planning area to which the ground projection position belongs is disclosed.

It will further be appreciated that a method of configuring the terminal to configure the time-to-live parameter of the TA-resident TA list is disclosed.

It will further be appreciated that methods for maintaining, updating and reporting the TA list based on the time-to-live parameter are disclosed.

It will further be appreciated that techniques for paging delivery based on TA list extension for implementation on a network-side device are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   receiving, by a user terminal, a network identifier in a message received on a broadcast channel;
   determining that a mobile network code in the network identifier corresponds to a non-terrestrial network; and
   determining, by the user terminal, that a planned tracking area code (TAC) and a planned tracking area identity (TAI) of a satellite cell are inconsistent with a current TAC and a current TAI being transmitted by the satellite cell to update the current TAC and the current TAI.

2. The method of claim 1, wherein the non-terrestrial network includes one or more of a satellite cell, a service link, a satellite, a feeder link, an earth station, a gateway and a core network.

3. The method of claim 1, further including: updating a tracking area list of the user terminal by adding or deleting a tracking area identifier corresponding to the non-terrestrial network to the tracking area list; and communicating the updated tracking area list to a network-side node.

4. A wireless communication apparatus comprising a processor of a user terminal configured to:
   receive a network identifier in a message received-on a broadcast channel;
   determine that a mobile network code in the network identifier corresponds to a non-terrestrial network; and
   determine that a planned tracking area code (TAC) and a planned tracking area identity (TAI) of a satellite cell are inconsistent with a current TAC and a current TAI being transmitted by the satellite cell to update the current TAC and the current TAI.

5. The wireless communication apparatus of claim 4, wherein the non-terrestrial network includes one or more of a satellite cell, a service link, a satellite, a feeder link, an earth station, a gateway and a core network.

6. The wireless communication apparatus of claim 4, wherein the processor is configured to:
   update a tracking area list of the user terminal by adding or deleting a tracking area identifier corresponding to the non-terrestrial network to the tracking area list; and
   communicate the updated tracking area list to a network-side node.

* * * * *